US005663224A

United States Patent [19]
Emmons et al.

[11] Patent Number: 5,663,224
[45] Date of Patent: Sep. 2, 1997

[54] PROCESS FOR PREPARING AN AQUEOUS DISPERSION

[75] Inventors: William David Emmons, Huntingdon Valley; Martin Vogel, Jenkintown; Edward C. Kostansek, Buckingham; Jack C. Thibeault; Peter R. Sperry, both of Doylestown; Chao-Jen Chung, North Wales, all of Pa.

[73] Assignee: Rohm and Haas Company, Philadelphia, Pa.

[21] Appl. No.: 801,989

[22] Filed: Dec. 3, 1991

[51] Int. Cl.$^6$ .................................................. C08K 5/54
[52] U.S. Cl. ................... 524/188; 523/210; 523/220; 523/222; 523/334; 524/446
[58] Field of Search ................... 523/210, 220, 523/222, 334; 524/188, 446

[56] References Cited

U.S. PATENT DOCUMENTS

| | | | |
|---|---|---|---|
| Re. 31,936 | 7/1985 | Sperry et al. | 524/522 |
| 2,930,775 | 3/1960 | Fordyce | 260/29.6 |
| 3,425,855 | 2/1969 | Barksdale et al. | 106/300 |
| 3,714,102 | 1/1973 | Reiss | 260/29.6 |
| 3,736,286 | 5/1973 | Scott | 260/29.6 |
| 3,884,864 | 5/1975 | Matsuda et al. | 260/29.7 |
| 3,935,340 | 1/1976 | Yamaguchi et al. | 427/216 |
| 3,953,657 | 4/1976 | Yamaguchi et al. | 428/406 |
| 3,967,006 | 6/1976 | Yamaguchi et al. | 427/221 |
| 4,025,483 | 5/1977 | Ramig, Jr. | 260/29.6 |
| 4,051,093 | 9/1977 | Wendel et al. | 260/29.6 |
| 4,062,692 | 12/1977 | Hemmerich et al. | 106/300 |
| 4,101,490 | 7/1978 | Pons et al. | 260/29.6 |
| 4,102,843 | 7/1978 | Sperry et al. | 260/29.6 |
| 4,110,285 | 8/1978 | Pons et al. | 260/29.6 |
| 4,315,959 | 2/1982 | Brandts Buys et al. | 427/214 |
| 4,341,213 | 7/1982 | Cohen | 128/284 |
| 4,421,660 | 12/1983 | Hajna | 252/62.54 |
| 4,435,540 | 3/1984 | Kishida et al. | 524/779 |
| 4,477,623 | 10/1984 | Pons et al. | 524/710 |
| 4,487,859 | 12/1984 | Martino | 523/406 |
| 4,487,860 | 12/1984 | Winner et al. | 523/408 |
| 4,487,861 | 12/1984 | Winner | 523/428 |
| 4,506,507 | 3/1985 | Greene et al. | 524/461 |
| 4,514,342 | 4/1985 | Billington et al. | 433/228 |
| 4,608,401 | 8/1986 | Martin | 523/205 |
| 4,658,003 | 4/1987 | Schmidt et al. | 526/278 |
| 4,680,200 | 7/1987 | Solc | 427/213.34 |
| 4,733,005 | 3/1988 | Schmidt et al. | 560/222 |
| 4,771,086 | 9/1988 | Martin | 523/205 |
| 4,798,854 | 1/1989 | Visca et al. | 523/334 |
| 4,800,103 | 1/1989 | Jeffs | 427/221 |
| 4,859,246 | 8/1989 | Sennett | 106/487 |
| 4,892,902 | 1/1990 | Shioji et al. | 524/417 |
| 4,916,172 | 4/1990 | Hayashi et al. | 523/171 |
| 4,918,211 | 4/1990 | Yokota et al. | 558/31 |
| 4,939,189 | 7/1990 | Tobinaga et al. | 523/205 |
| 4,981,882 | 1/1991 | Smith et al. | 523/205 |
| 5,049,594 | 9/1991 | Jeffs | 523/205 |
| 5,064,718 | 11/1991 | Buscall et al. | 428/407 |

FOREIGN PATENT DOCUMENTS

| | | |
|---|---|---|
| 0221498 | 5/1987 | European Pat. Off. . |
| 0255079 | 2/1988 | European Pat. Off. . |
| 0327199 | 8/1989 | European Pat. Off. . |
| 0337672 | 10/1989 | European Pat. Off. . |
| 0392065 | 10/1990 | European Pat. Off. . |
| 1134836 | 4/1960 | Germany . |
| 61-143411 | 7/1986 | Japan . |
| 1302269 | 12/1989 | Japan . |
| 958856 | 6/1962 | United Kingdom . |

OTHER PUBLICATIONS

Braun, J.H., *J. Coatings Technology* 60, 67–71 (1988).
Brisson, A. et al. *J. Coatings Technology* 63, 59–65 (1991).
Chemical Abstracts 100: 140128 f (1984).
Craft, R. *Modern Paint and Coatings*, 38–43 (1991).
Cutrone, L. *J. Coatings Technology* 58, 83–88 (1986).
Dunn, E. A., Jr. et al. *J. Paint Technology* 40, 112–122 (1968).
Fadatt, G. et al. *Nordic Pulp and Paper Research Journal* 4, 30–36 (1986).
Fadatt, G. et al. *Nordic Pulp and Paper Research Journal* 4, 37–43 (1986).
Fitzwater, S. et al. *J. Coatings Technology* 57, 39–47 (1985).
Furusawa, K. et al. *Colloid & Polymer Sci.* 265, 882–888 (1987).
Furusawa, K. et al., *Kobunshi Ronbunshu* 46, (1), 21–27 (1987).
Goodwin, J.W. et al. *Faraday Discuss Chem Soc.* 65, 338–339 (1978).
Hasan, M.S. *Journal of Polymer Science: Polymer Chemistry Edition*, 20 2969–2978 (1982).
Hansen, F.K. et al. *J.C.S. Faraday I* 76, 1240–1262 (1980).
Hasegawa, M. et al. *J. Appl. Polym. Sci.* 33, 411–418 (1987).
Hasegawa, M. et al. *Journal of Polymer Science: Part A: Polymer Chemistry*, 25 3117–3125 (1987).
Hook, J.W., *J. Coatings Technology* 58, (742), 81–82 (1986).
Hoy, K.L., Journal of Coatings Technology 51, 651, 27–41 (1979).
Kato, K. et al. *Progr. Organic Coatings* 16, 51–75 (1988).
Kato, K. et al. *Colloids and Surfaces* 23, 159–170 (1987).
Luckham, P. et al. *Colloids and Surfaces* 1, 281–293 (1980).
Matijevic, E. et al *Croatica Chemica Acta* 50, 93–105 (1977).
Matijevic, E. et al. *Colloid & Polymer Sci.* 261, 527–534 (1983).
Meguro, K. et al. *Bull. Chem. Soc. Jpn.* 59, 3019–3021 (1986).

(List continued on next page.)

*Primary Examiner*—Romulo H. Delmendo
*Attorney, Agent, or Firm*—Marc S. Adler; David T. Banchik

[57] ABSTRACT

Inorganic material particles are dispersed in an aqueous medium with surface charge adjusting additives to give a moderately stable slurry or pigment grind. The dispersion can be used to prepare fully formulated compositions. Products formulated using the aqueous dispersion can be prepared to give the same performance as products including inorganic material dispersed with conventional polyelectrolyte pigment dispersants, but with higher levels of inorganic material, or superior performance properties with like levels of inorganic material.

6 Claims, No Drawings

OTHER PUBLICATIONS

Peacock, J., *11th PATIPEC Congress*, (1972).

Spalding, B.J. *Chemical Week*, Sep. 3, 1986.

Templeton–Knight, R. *Chemistry & Industry*, 512–515 (1990).

Vincent, B. et al. *Faraday Disc. Chem. Soc.* 65, 296–305 (1978).

Vincent, B. et al. *J.C.S. Faraday I* 76, 674–682 (1980).

Yamaguchi, T. et al. *Die Angewandte Makromolekulare Chemie* 53, 65–72 785 (1976).

Balfour, J.G. et al. *J. Oil Col. Chem. Assoc* 58, 331–344 (1975).

Bleier, A. et al. *J. Colloid Interface Sci.* 55, 510–524 (1976).

Bleier, A. et al. *J. Chem. Soc.* 74, 1346–1359 (1978).

"Mechanisms of Pigment Dispersion Stabilization in Water–Borne Coatings," Craft, Rebecca *Modern Paint & Coatings*, Mar. 1991.

PROCESS FOR PREPARING AN AQUEOUS DISPERSION

BACKGROUND OF THE INVENTION

1. Field of the Invention

This invention relates generally to a process for preparing aqueous compositions including inorganic material particles, and more particularly to the dispersion of inorganic material particles in products formed by the loss of water from such aqueous compositions.

2. Background of the Invention

Aqueous dispersions of polymeric latex are used to prepare a tremendous variety of commercially important products, including coatings, primers, mastics, caulks, binders for non-woven materials, and adhesives. Frequently, the polymeric latex is included to form a continuous phase as the water is lost in order to bind the product together, and to contribute important physical properties. In addition to the polymeric latex, most products include particles of one or more inorganic materials. Some inorganic materials contribute an important functional property to the product, such as fire resistance, sheen, flatting, hardness, color, texture, or toughness. Often these inorganic materials are relatively expensive, and it is desirable to employ them in the formulated product as efficiently as posssible. In other instances, the inorganic materials, for example, fillers, may be less expensive than the latex and it may be desired to incorporate the maximum amounts possible without compromising the desirable properties attributable to the latex, such as, for example, binding and tensile properties, such as elongation and, in the case of adhesives, minimum loss of tackiness. Since the polymeric latex is typically the most expensive component of the formulated product, inexpensive inorganic materials are frequently included to reduce product cost. In this case, it is desirable to use the greatest possible volume of the inexpensive inorganic material, while still retaining the desired performance properties of the product, since these properties typically decline when too much of the inexpensive inorganic material is included. A good example is a coating formulated with so much of an inexpensive filler pigment, such as calcium carbonate, that the critical pigment volume concentration is exceeded. Such a coating will provide a much less protective coating for a surface on which it is applied than a similar coating formulated with slightly less filler, and having a pigment volume concentration below the critical level.

One way of making efficient use of the inorganic material employed is by dispersing this pigment as well as possible. Agglomerated or aggregated inorganic material pigment particles frequently make less than their full potential contribution to the performance of the product, such as, for example, strength and resistance properties. Inorganic materials are typically sold as dry powders. As a practical matter, this powder must be milled in a liquid medium to break up agglomerates and to obtain a colloidally stable dispersion.

In order to stabilize the product formulation against settling or flocculation, a variety of surface active dispersing additives have been used. Manufacturers have often used inorganic materials as dry powders. In this case, a dispersing additive is usually added directly to the material and a small amount of water in a preliminary "grind" step in which loose agglomerates of the inorganic material particles are broken up by mechanical shear forces. The dispersing additive typically remains in the mix through the subsequent steps in the product preparation process and typically will be found in the fully formulated product composition.

Sometimes inorganic materials are commercially supplied in concentrated slurry form, such as, for example, in water. However, since the inorganic material particles in the slurries are prone to aggregation upon storage, the slurries often need to be redispersed for maximum effectiveness before use in formulating a coating composition. Either the manufacturer of the inorganic material slurry or the end user of the slurry, and sometimes both, may perform the redispersion step. This step is another source of dispersing agent in the fully formulated product.

The traditional guiding rule or goal in the formulation of practical, dispersed inorganic material-containing products, such as coatings, is to make the inorganic material dispersion and the polymeric latex binder dispersions as colloidally stable and compatible with each other as possible, in the sense that they can be mixed without formation of coagulum or like aggregate or excessive increases in viscosity. It has heretofore been found that inorganic material particles cannot be effectively dispersed into aqueous latex compositions by simply blending or directly mixing them into the aqueous polymeric latex composition. When such direct blending of inorganic material particles has been attempted, agglomeration of the particles has resulted in the formation of grit or coagulum in the composition. Products containing grit or coagulum may suffer the loss of properties such as gloss, mechanical strength and impermeability. Even in the case of nonaqueous (solvent-borne) or 100% solids polymer compositions, high energy grinding or milling input has been found to be necessary to deagglomerate and wet out the inorganic material particles. Even with the use of such operations, inferior dispersions containing aggregates of inorganic material particles result unless significant quantities of dispersing, wetting or "coupling" agents are employed.

In the case of many compositions including polymeric latex, such as polymeric latex adhesives, and latex coatings, it is conventional practice to first form a stable aqueous dispersion of the inorganic materials including the pigments, fillers and extenders. This dispersion, also known as a "grind" or "millbase," may contain water-miscible solvents, such as for example glycols and glycol ethers, and relatively low molecular weight water soluble polyelectrolytes as inorganic material pigment grinding aids or dispersants. Generally, these pigment dispersants are anionic polyelectrolytes. Many different types of such dispersants are known. For example, U.S. Pat. No. 2,930,775 discloses the water soluble salts of diisobutylene maleic anhydride copolymers having molecular weights between about 750 and 5,000 as dispersants when employed at concentrations of from about 0.05 to 4% on pigment weight. U.S. Pat. No. 4,102,843 and U.S. Pat. No. Re. 31,936 disclose the use of water soluble salts of copolymers of hydroxyalkyl (meth)acrylates and (meth)acrylic acid of molecular weights of from 500 to 15,000 at concentrations of from about 0.01 to 5% on pigment to produce glossy emulsion coatings. U.S. Pat. No. 4,243,430 discloses a water-soluble dispersant comprising an addition copolymer comprising greater than 30% alpha, beta-unsaturated monovinylidene carboxylic acid, the copolymer having an apparent $pK_a$ between 6.0 and 7.5 and molecular weight between about 500 and 15,000, and forming a water soluble salt with zinc ammonia complex ion. Low molecular weight polyphosphate salts, such as potassium tripolyphosphate, are also used because they are relatively inexpensive, but they tend to have marginal hydrolyric stability.

The use of these and other polyelectrolyte dispersants is described in T. C. Patton, *Paint Flow and Pigment Disper-*

*sion* (Wiley Interscience, 2nd edition) 290–295 (1979). Also described therein (pages 468–497) are a number of milling devices used in the preparation of pigment dispersions. One such device which is commonly used in the manufacture of latex paints is the high speed disk disperser designed to develop high shearing forces in the pigment grinding step. Common practice is to use the device with dispersant to form a stable dispersion of inorganic material pigment, and then to add to the dispersion the aqueous latex polymer binder along with the other ingredients, such as for example thickeners and rheology modifiers, antifoaming agents, colorants, coalescing agents or temporary plasticizers for the latex polymer particles, and surfactants for substrate wetting and colorant comparability. The pigment dispersion process and the relation to flocculation and other properties are discussed further in *Treatise on Coatings*, Vol. III, Part 1 (Marcel Decker) (1975); *Pigment Handbook*, Vol. I (2nd edition, Wiley Interscience) (1988), and *Pigment Handbook*, Vol. III (Wiley Interscience) (1973). Other types of pigment dispersion equipment are also employed, including ball mills, sand mills, Banbury mixers, and the like, depending on the nature and physical characteristics of the product.

While these polymeric dispersants and procedures enable the formulation of practical aqueous formulations, they have certain undesirable characteristics. Because of their ionic nature, polyelectrolyte dispersants tend to impart water sensitivity to films, which can result in reduced resistance of the films to scrubbing, and increased swelling with a tendency,towards delamination and blistering. Similarly, the presence of polyelectrolyte dispersants can reduce the corrosion resistance of coatings films applied to steel surfaces. Moreover, such polyelectrolyte stabilized dispersions of inorganic material particles are prone to flocculation and reaggregation by other ionic species in the aqueous formulation, such as, for example, from initiator residues and from soluble inorganic pigments, especially those which contribute multivalent ions such as zinc oxide and calcium carbonate. Furthermore, since films dry by water evaporation, the concentration of such ionic species in the coating or film increases upon drying, and an otherwise suitable dispersion may become aggregated during the drying process itself. The stability and instability of inorganic material dispersions in the presence of polyelectrolytes and multivalent metal ions has been described by Burlamacchi, et al., *Colloids and Surfaces* 7, 165 (1982).

A number of techniques have been proposed to disperse inorganic particles such as inorganic material particles in aqueous polymer containing coating compositions.

There is a continuing need to improve the effective utilization of inorganic material in aqueous compositions and thereby to improve the performance properties of the compositions. In addition, there is a need for a process to disperse inorganic material particles at high concentrations for use in coating and related types of compositions with a minimal amount of dispersing surfactant and with the substantial absence of grit.

SUMMARY OF THE INVENTION

The present invention provides a process for preparing an aqueous dispersion including polymeric latex and inorganic material particles which can be used in preparing formulated aqueous compositions, such as coating compositions, adhesives, binders, and for non-woven materials, which in turn give coatings and other products in which the inorganic material is more efficaciously dispersed than in prior art formulations. The improved dispersion of the inorganic material particles provided by the process of the present invention advantageously provides greater flexibility in preparing aqueous compositions including dispersed inorganic material. For example, in some cases the present process provides a means of reducing the amount of inorganic material required to provide desired properties, such as mechanical properties. In other cases, in which the inorganic material is inexpensive, the present process provides a means of increasing the amount of inorganic material which can be included in an aqueous composition to reduce cost while maintaining performance properties.

In a presently preferred embodiment, the process of the present invention comprises:

a) suspending inorganic material particles in an aqueous medium;

b) suspending polymeric latex particles in the an aqueous medium;

c) adjusting the zeta potential of the inorganic material particle surface to between about zero and −50 mv, and such that the sign of the surface charge of the polymeric latex particles is the same as the sign of the surface charge of the inorganic material particles and the zeta potential of the polymeric latex particles in the aqueous medium is greater in absolute value than the zeta potential of the inorganic material particles in the aqueous medium; and d) mixing the aqueous medium containing the inorganic material particles and the polymeric latex particles to provide a stable dispersion.

The inorganic material particles and the polymeric latex particles can be mixed in any order, and in the same or different aqueous medium. In one aspect of the present invention, the zeta potential of the inorganic material particles is adjusted prior to mixing the aqueous medium containing the inorganic material particles and the polymeric latex particles. In another aspect, the zeta potential of the inorganic material particles is adjusted subsequent to mixing the aqueous medium containing the inorganic material particles and the polymeric latex particles.

In practicing the first presently preferred embodiment of the process of the present invention, the aqueous medium containing the inorganic material particles and the polymeric latex particles is generally preferred to be substantially free of polyelectrolyte dispersants, such as potassium tripolyphosphate, polyacrylic acid, polymethacrylic acid, and the like, which are often used as dispersion aids in preparing a pigment grind.

The process of the present invention further contemplates preparing fully formulated aqueous compositions, including aqueous coating, adhesive and binder compositions, using the aqueous dispersions formed by the process of the present invention, and the subsequent use of the fully formulated aqueous compositions to form products, including coatings, adhesives and binders, and articles made using these products, such as coated articles, bound fiberfill articles, coated paper and boardstock, and the like. While the aqueous dispersion formed by the process of this invention can be used directly in some cases to form products, in many instances it is desirable to employ the aqueous dispersion of the present invention as an intermediate in the production of an aqueous composition, such as a coating, adhesive or binder composition, including one or more additional components (a "fully formulated" composition). The aqueous dispersions of the present invention resulting from this process are particularly useful for improving the performance properties and permeability of coatings, films, adhesives and binders formed therefrom. Alternatively, the availability of the process of the invention offers the ability to formulate coatings and films of substantially equal performance properties as conventional systems but with lower concentrations of expensive inorganic materials and accordingly at lower cost. In addition, the present process permits low cost inorganic material particles to dispersed in certain adhesives and binders which conventionally have not included such materials, because their presence significantly degraded important performance properties. Similarly, the present process permits low cost inorganic material particles to be dispersed at even higher levels than otherwise in some systems, further reducing product raw material costs.

DETAILED DESCRIPTION

The process of the present invention provides for the adjustment of the properties of inorganic material particles and employs the selection of properties of polymeric latexes for use in preparing stable aqueous dispersions. The process provides a solution to the problem of how to practically utilize polymeric latex particles and inorganic material particles to improve the performance properties in aqueous-based coatings, mastics, caulks, adhesives and binders for non-woven materials containing high concentrations of inorganic material particles.

Polymeric latex particles of selected composition, size and surface charge can be effectively used in the process of the present invention to disperse inorganic material particles in concentrated dispersions.

The present process provides for concentrated, stable aqueous dispersions, which are particularly useful for improving the permeability, and optical and mechanical properties including the gloss, color development, high shear viscosity and scrub resistance, of coatings, films, mastics, caulks, binders, and adhesives formed therefrom. Alternatively, the process of the invention offers the ability to formulate coatings, films, adhesives and binders of substantially equal performance properties as conventional systems but with lower inorganic material particle concentrations if desired. In addition, the present process permits low cost inorganic material particles to be dispersed in certain adhesives and binders which have conventionally omitted such materials, because their presence previously significantly degraded important performance properties. Similarly, the present process permits low cost inorganic material particles to be included at even higher levels in some compositions than would otherwise be possible without sacrificing important performance properties, further reducing the total cost of raw materials for these compositions.

A number of factors relate to and can affect the process of forming the aqueous dispersion of the present invention. These factors include the characteristics of the polymeric latex particles, of the inorganic material particles, and of the aqueous medium used in the process of the invention. For example, with respect to the polymeric latex particles, these factors include the monomer composition, the particle size, and particle size distribution, and surface potential or surface charge density as well as the nature and proportion of functional groups at the particle surface; with respect to the inorganic material particles, the factors include the particle size, particle size distribution, surface potential or surface charge density of the particles, and whether there are species adsorbed on the surface, such as polyelectrolyte dispersants and/or polymeric steric stabilization agents; with respect to the medium, the pH, the ionic content of the medium, and the dielectric constant can all be significant, as can the concentration and nature of other surface active substances present in the medium, such as pigment dispersants and surfactants.

In some cases a commercially available polymeric latex has suitable properties and can be selected for use in the process of this invention. In other cases, it may be desirable to modify an existing polymeric latex so that it possesses these properties. In still other cases, a special polymeric latex can be prepared for use in the process of this invention.

Some commercial grades of inorganic material can be dispersed for use in the process of this invention without prior treatment or modification. However, there may be some situations in which it is desirable to treat or modify the inorganic material particles before dispersion is attempted. For example, it may be desirable to adsorb a small molecular species such as an anionic surfactant to modify the surface charge density of the inorganic material (that is, by making the surface charge density more negative and thus raising its absolute value) before the dispersion is carried out. Similarly, a cationic material could be adsorbed to make the surface charge density of the inorganic material less negative. In other cases, such as in the case of titanium dioxide, it may be desirable to select a commercially available grade of the inorganic material particles with an appropriate inorganic material surface treatment (such as surface silica or alumina on titanium dioxide particles) to give a desired surface potential. In some cases, it may be desirable to adsorb a polyelectrolyte dispersant or a polymeric steric stabilization agent onto the surface of the inorganic material particles. In general, adjusting the surface potential of the inorganic material particles can take place either before or after the polymeric latex particles and the inorganic material particles are mixed.

In addition, it may be desirable to modify the aqueous medium used, such as by adjusting the pH to provide the desired zeta potentials on the particles, by addition of salts to increase the ionic strength of the medium, or the like. Further, modification of the aqueous medium before dispersion of the inorganic material, or subsequent to that dispersion, can be accomplished by addition of surface active agents such as conventional polyelectrolyte pigment dispersants or anionic surfactants, or the like, with the understanding that such surface active agents may adsorb to the inorganic material particles and change their effective surface potential. Modification of the medium may also occur as an incident to steps taken to modify the surface properties of the polymeric latex or the inorganic material particles.

The present invention provides a process for preparing an aqueous composition in which inorganic material particles are suspended in an aqueous medium, the mixture including the inorganic material particles being slightly unstable with respect to self-aggregation and with respect to interaction with the polymeric latex particles to form a stable aqueous dispersion. Preferably, conditions are adjusted so that rapid reaction forming a substantial proportion by weight (such as about one percent by weight of total solids) of aggregates including multiple inorganic material particles is avoided.

The weight of aggregated material including multiple inorganic material particles ("grit") which is acceptable depends greatly on the properties required in the fully aqueous compositions. For example, when the aqueous dispersion of the process of the present invention is formulated into high gloss aqueous coating compositions, even very low levels of macroscopic aggregation leading to grit can significantly detract from the appearance of the coated article. This effect can be gauged readily by visual observation, either directly or with the aid of a low powered optical microscope, of a dried film prepared by drawing down a smooth layer of the high gloss aqueous coating over an impervious substrate. In cases of severe grit, the dried coating will display a very rough surface texture with an almost sand paper-like appearance. In mild cases, however, the surface will have normal smoothness with only an occasional grit particle protruding. Since gloss is not measurably reduced by such low levels of grit it becomes a subjective decision as to just how much grit is tolerable without unduly compromising appearance. Lower gloss coatings show similar behavior except that the grit is less apparent to the observer and therefore slightly higher levels may be allowable. For applications where appearance is not of major concern, other criteria will determine the acceptable grit level, for example, viscosity or mechanical strength. In such cases much higher levels of grit are usually permissible and other methods of assessing grit may be more useful.

An alternative way to stabilize colloidal particles against grit formation is to provide a surface layer or sheath of water soluble polymer around the colloidal particle, the chains of which polymer extend into the aqueous phase. This provides a steric barrier between the particles and between such a particle and other surfaces. A variety of water soluble polymers are suitable, e.g., polyacrylamide, polyvinyl alcohol, polyethylene oxide, water soluble polymers derived from cellulose. The water soluble polymers may be suitably attached to the particle surfaces by several means, among them by chemical grafting, such as through polymerizable unsaturated groups linked to the water soluble polymer, as well as by physical adsorption, often enhanced by the presence of a hydrophobic group attached to the water soluble polymer. The hydrophobic group may be simply a hydrocarbon chain or a water insoluble block polymer attached to the water soluble portion of the polymer. Steric stabilization has been thoroughly described by a number of authors, e.g., D. H. Napper, *Polymeric Stabilization of Colloidal Dispersions*, Academic Press, 1983; E. D. Goddard and B. Vincent, *Polymer Adsorption and Dispersion Stability*, ACS Symposium Series 240, 1984. Partial to thorough aggregation of sterically stabilized particles may be accomplished by reducing the solvency of the medium for the attached polymer chains, e.g., by variations in temperature, pressure, or composition of the liquid medium as described by Napper, 1983, chapter 5. For instance, a dispersion sterically stabilized with polyethylene oxide chains can be destabilized by the addition of salt or a water miscible non-solvent for the polymer.

The present invention also contemplates a process for preparing an aqueous dispersion comprising suspending inorganic material particles in an aqueous medium and further suspending the polymeric latex particles in the aqueous medium, the polymeric particles being stabilized by polymeric steric stabilization, the surface potential of one of either of the polymeric latex particles or the inorganic material particles in the aqueous medium being greater in absolute value than the surface potential of the other of the polymeric latex particles and the inorganic material particles. Also included is mixing the aqueous medium containing the inorganic material particles and the polymeric latex particles.

In the case of particles stabilized by surface charge, an approximate measure of, and often useful guide to, the surface potential of particles in an aqueous medium is the particles' zeta potential. However, it should be noted that there may be a significant difference between the measured zeta potential and the potential at the true inorganic material particle surface when dispersants, surfactants, or other materials, such as cellulosic thickeners or protective colloids, are adsorbed onto the surface of the inorganic material particles.

The measurement of zeta potentials is discussed in detail in R. J. Hunter, *Zeta Potential in Colloid Science* (Academic Press 1981). Although a variety of techniques have been used for determining zeta potentials, the most common method for colloidal suspensions of either polymeric latex particles or dispersed inorganic pigment particles is electrophoresis, in which the movement of individual particles under the influence of an external electric field is observed, either directly, by a light microscope, or indirectly. The particle velocities or mobilities measured are then used to calculate the zeta potential. As measurements must be made at low concentrations (for example, at 0.1% w/w or less), samples often must be substantially diluted with an appropriate diluent, such as a standard reference solution, or an aliquot of the sample's own continuous phase obtained by filtration, centrifugation, or another method.

Recently, it has become possible to measure zeta potentials in concentrated colloidal suspensions by analytical techniques such as measurement of colloidal ultrasonic vibration potential. This method is discussed in B. J. Marlow et al., Langmuir, 4, pp. 611–26 (1988) and described in U.S. Pat. No. 4,907,453 and can be accomplished using instruments available from Pen Kem Inc. Similarly, zeta potentials in concentrated colloidal suspensions can now be measured by measurement of electrokinetic sonic amplitude such as disclosed in U.S. Pat. No. 4,497,208 using instruments such as those available from Matec Instruments, 75 South Street, Hopkinton, Mass. 01748. The zeta potentials referenced in the present specification and claims are preferably measured using a concentrated suspension measurement technique, as most practical applications are found in concentrated systems.

In the first preferred embodiment of the present process it is preferred that the zeta potential of the polymeric latex particles in the aqueous medium be greater in absolute value (that is, more negative) than the zeta potential of the inorganic material particles in the aqueous medium. Preferably, the absolute value of the zeta potential of the polymeric latex particles is at least about 20 mv and more preferably at least about 40 mv, while the absolute value of the zeta potential of the inorganic material particles is at least about 5 mv and more preferably at least about 20 mv.

It is preferable that the surface potential of the polymeric latex be more negative than about −20 mV (measured as zeta potential) otherwise the polymeric latex particles themselves will tend to lack adequate stability. It is even more preferable in this regard that the surface potential be more negative than about −40 mV. On the other hand, it is preferred that the surface potential of the polymeric latex be not more negative than about −150 lmV. In general, the potential of the polymeric latex particles in a given practical circumstance should be within these general ranges as determined by a rational empirical experimental procedure.

It is preferable that the surface potential of the inorganic material particle be more negative than about −5 mV, and even more preferable that it be more negative than about −20 mv. In any event it should not be more negative than about −50 mV. Again, the optimum surface potentials are best established by the empirical procedure for the desired combination of inorganic particles and polymeric latex particles.

The surface potential and the zeta potential of a particle suspended in an aqueous medium can often be adjusted by changing the characteristics of the aqueous medium. For example, many inorganic particles have acidic and/or basic functional groups at their surfaces, or can be treated to provide such groups at the particles surfaces, such as by adsorption of anionic pigment dispersants and/or anionic surfactants, and the surface potential of these particles can be adjusted by varying the pH of the aqueous medium. Similarly, polymeric latex particles can be synthesized with acidic and/or basic functional groups at their surfaces, and the surface charge density of these particles can also be adjusted by varying the pH of the aqeuous medium. In case of synthetic polymeric latex particles, the absolute value of the surface charge density can also be controlled by adjusting the density of surface acid and/or base groups through selection of polymer composition and polymerization process variables. An emulsion polymerization process which provides a preferential distribution of acid functionality for the particles, such as proximate the surface of the particles, can be used to prepare the polymeric latex particles.

The zeta potential of commercial grades of some types of inorganic material varies inversely with pH, such as from about 50 mv at a pH of about 3.5 to about −30 mv at a pH of about 11 (titanium dioxide). The zeta potential of many types of inorganic material particles is negative in a basic aqueous medium. Preferably, the zeta potential of the inorganic material used in the process of the present invention is negative, with a zeta potential from about −5 mv to −50 mv being preferred, a zeta potential from about −10 mv to −50 mv being more preferred, and a zeta potential from about −20 mv to −50 mv being especially preferred.

The zeta potential of the polymeric latex particles used in the first presently preferred embodiment of the process of this invention is more negative than the zeta potential of the inorganic material particles, and preferably is from about −20 mv to −120 mv, more preferably from about −40 mv to −110 mv.

The product of the zeta potentials depends directly on the zeta potential of the polymeric latex particles (and the inorganic material particles), which can be adjusted by varying pH, polymer composition, polymerization process variables, and the like. In the first embodiment of the present process of the invention, the product of the zeta potentials preferably is from about 100 mv$^2$ to 8400 mv$^2$.

Serum pH can have large effects on the surface potential of colloidal particles and accordingly can be used for purposes of adjustment as long as pH requirements are not fixed by other performance requirements of the coating or other aqueous formulation. For instance, metal container corrosion and rusting of ferrous substrates can occur if a coating formulation pH is too low, for example, less than about 7–8, and thus one could not access lower pH for the purpose of preparation of the colloidal microcomposites of the invention although, of course, pH can often be readjusted upward following their preparation at lower pH. It is well known that lower pH will tend to make the surface potential of particles more positive, and vice versa. The entire accessible pH scale is useful in the practice of this invention although it is preferred for reasons of excessive particle solubility, corrosion both to substrates and to the skin, and the like to restrict the range to approximately 2 to 12 and more preferably in the range of from about 4 to about 10. Numerous examples of the effect of pH on zeta potential both for inorganic and organic particles are found in texts on colloid chemistry such as R. J. Hunter, *Zeta Potential in Colloid Science*, Academic Press, 1981.

The ionic content of the serum can affect the process of the present invention. For a given organic or inorganic colloidal particle, there may be a specific adsorption of certain ions, and the surface potential of the particle will be raised or lowered according to the sign of charge of the ion. In general, however, one usually desires to minimize the electrolyte content of aqueous polymeric latex formulations because of deleterious effects on water resistance of the dried films or coatings, and it is more advantageous to adjust surface potentials of the emulsion and inorganic particles by more selective additives such as the dispersants such as those of the polyelectrolyte type and surface active agents heretofore noted. However, in the case of an ion which may specifically and efficiently adsorb on a particle its use may be advantageous. For example, multivalent cations such as $Al^{+3}$ are useful at low levels, for example, less than about one percent based on the weight of the inorganic particle, in reducing the negative surface charge of inorganic material particles, without resorting to pH reduction alone. Additional examples of the effect of ionic content on surface potential are described in standard texts such as Hunter's *Zeta Potential in Colloid Science*.

With regard to the average particle size or diameter of the polymeric latex particles and the inorganic material particles employed in the present process, it is generally preferred that the polymeric latex particles have an average diameter of from about 20 nm to about four times that of the inorganic material particles. The average particle size or diameter of the polymeric latex particles can range from about 20 nm to 20,000 nm, as the average particle size of the inorganic particles can range from about 100 nm to 100,000 nm.

The concentration of the inorganic material particles (and any other pigments which may be present in the composition) in a coating formulation is expressed in terms of the pigment volume concentration of the formulation. The pigment volume concentration (hereinafter referred to as the "PVC") of a formulation is defined as the volume amount of inorganic particles, including inorganic material and other pigment particles as well as extender particles, present in the formulation, divided by the sum of the volume amount of such inorganic particles plus polymeric latex particle solids in the formulation. The overall concentration of pigment particles, extender particles and emulsion polymer particles in a formulation is typically expressed in terms of a percent volume solids for the formulation. The percent volume solids is an expression of the extent of the dilution of the solids in a liquid vehicle, such as water.

It is desired that conditions be selected so that the formation of grit is substantially avoided. The extent of grit formation can be assessed empirically by making a drawdown of the fully formulated composition and noting the appearance of granular or irregular texture. Thus, grit formation is more readily apparent, and more undesirable, in gloss and semi-gloss coating compositions, than in flat coatings, for example. Variables which influence the formation of the aqueous dispersion of the present invention include particle surface charge, the presence and nature of diapersants or surfactants adsorbed on the surface of the inorganic material particles, the pH and ionic strength of the aqueous medium, as well as reaction conditions such as particle concentrations, temperature, and agitation.

The polymeric latex used in the present invention can be prepared by any technique known in the art, such as suspension polymerization, interfacial polymerization, or emulsion polymerization. Emulsion polymerization techniques for preparing aqueous dispersions of latex polymer particles from ethylenically unsaturated monomers are well known in the polymer arts, and any conventional emulsion technique can be used, such as single and multiple shot batch processes, and continuous processes. If desired, a monomer mixture can be prepared and added gradually to the polymerization vessel. The monomer composition within the polymerization vessel can be varied during the course of the polymerization, such as by altering the composition of the monomer being fed into the vessel. Both single and multiple stage polymerization techniques can be used. The latex polymer particles can be prepared using a seed polymer emulsion to control the number of particles produced by the emulsion polymerization as is known in the art. The particle size of the latex polymer particles can be controlled by adjusting the initial surfactant charge as is known in the art. The preparation of polymeric latexes is discussed generally in D. C. Blackley, *Emulsion Polymerization* (Wiley, New York, 1975). The preparation of acrylic polymeric latexes is described in, for example, *Emulsion Polymerization of Acrylic Polymers*, Bulletin, Rohm and Haas Company, Philadelphia.

A polymerization initiator can be used in carrying out the polymerization of the polymeric latex particles. Examples of polymerization initiators which can be employed include polymerization initiators which thermally decompose at the polymerization temperature to generate free radicals. Examples include both water-soluble and water-insoluble species. Examples of free radical-generating initiators which can be used include persulfates, such as ammonium or alkali metal (potassium, sodium or lithium) persulfate; azo compounds such as 2,2'-azo-bis(isobutyronitrile), 2,2'-azo-bis(2, 4-dimethylvaleronitrile), and 1-t-butyl-azocyanocyclohexane); hydroperoxides such as t-butyl hydroperoxide and cumene hydroperoxide; peroxides such as benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, and t-butylperoxy pivilate; peresters such as t-butyl peracetate, t-butyl perphthalate, and t-butyl perbenzoate; as well as percarbonates, such as di(1-cyano-1-methylethyl)peroxy dicarbonate; perphosphates, and the like.

Polymerization initiators can be used alone or as the oxidizing component of a redox system, which also includes a reducing component such as ascorbic acid, malic acid, glycolic acid, oxalic acid, lactic acid, thiogycolic acid, or an alkali metal sulfite, more specifically a hydrosulfite, hyposulfite or metabisulfite, such as sodium hydrosulfite, potassium hyposulfite and potassium metabisulfite, or sodium formaldehyde sulfoxylate. The reducing component is frequently referred to as an accelerator or a catalyst activator.

The initiator and accelerator, commonly referred to as catalyst, catalyst system or redox system, can be used in proportion from about 0.001% to 5% each, based on the weight of monomers to be copolymerized. Promoters such as chloride and sulfate salts of cobalt, iron, nickel or copper can be used in small amounts. Examples of redox catalyst systems include tert-butyl hydroperoxide/sodium formaldehyde sulfoxylate/Fe(II), and ammonium persulfate/sodium bisulfite/sodium hydrosulfite/Fe(II). The polymerization temperature can be from room temperature to about 90° C., and can be optimized for the catalyst system employed, as is conventional.

Chain transfer agents can be used to control polymer molecular weight, if desired. Examples of chain transfer agents include mercaptans, polymercaptans and polyhalogen compounds. Examples of chain transfer agents which may be used include alkyl mercaptans such as ethyl mercaptan, n-propyl mercaptan, n-butyl mercaptan, isobutyl mercaptan, t-butyl mercaptan, n-amyl mercaptan, isoamyl mercaptan, t-amyl mercaptan, n-hexyl mercaptan, cyclohexyl mercaptan, n-octyl mercaptan, n-decyl mercaptan, n-dodecyl mercaptan; mercapto carboxylic acids and their esters, such as methylmercaptoproionate and 3-mercaptopropionic acid; alcohols such as isopropanol, isobutanol, lauryl alcohol and t-octyl alcohol; halogenated compounds such as carbon tetrachloride, tetrachloroethylene, and tricholoro-bromoethane. Generally from 0 to 10% by weight, based on the weight of the monomer mixture, can be used. The polymer molecular weight can be controlled by other techniques known in the art, such as selecting the ratio of initiator to monomer.

Catalyst and/or chain transfer agent can be dissolved or dispersed in separate or the same fluid medium and gradually added to the polymerization vessel. Monomer, either neat or dissolved or dispersed in a fluid medium, can be added simultaneously with the catalyst and/or the chain transfer agent. Amounts of initiator or catalyst can be added to the polymerization mixture to "chase" residual monomer after polymerization has been substantially completed to polymerize the residual monomer as is well known in the polymerization arts.

Aggregation of polymeric latex particles is typically discouraged by including a stabilizing surfactant in the polymerization mix. In general, the growing latex particles are stabilized during emulsion polymerization by one or more surfactants such as an anionic or nonionic surfactant, or a mixture thereof, as is well known in the polymerization art. Many examples of surfactants suitable for emulsion polymerization are given in *McCutcheon's Detergents and Emulsifiers* (MC Publishing Co., Glen Rock, N.J.), published annually. Other types of stabilizing agents, such as protective colloids, can also be used.

The polymeric latexes useful in the process of the present invention can be prepared from a wide range of polymerizable monomers, such as, for example, monoethylenically unsaturated monomers, including alpha, beta-monoethylenically unsaturated monomers such as alkyl acrylates and methacrylates. By "acrylic polymeric latex" is meant a polymeric latex polymerized from monomers comprising substantially polymerizable monomers including the acryl group (—COCH=CH$_2$) or methacryl (—COC(CH$_3$) =CH$_2$) group, and specifically greater than about 80 weight percent (meth)acrylic monomers, based on the total monomer weight. Mixtures of polymeric latexes can also be used.

Examples of polymeric latexes which can be employed in the process of the present invention include those polymerized from ethylenically unsaturated monomers, such as alpha, beta-ethylenically unsaturated monomers, including styrene, butadiene, alpha-methylstyrene, vinyltoluene, vinylnaphthalene, ethylene, vinyl acetate, vinyl versatate, vinyl chloride, vinylidene chloride, acrylonitrile, methacrylonitrile, (meth)acrylamide, various ($C_1$–$C_{20}$)alkyl esters of (meth)acrylic acid; for example, methyl (meth) acrylate, ethyl (meth)acrylate, n-butyl (meth)acrylate, isobutyl (meth)acrylate, 2-ethylhexyl (meth)acrylate, cyclohexyl (meth)acrylate, n-octyl (meth)acrylate, n-decyl (meth) acrylate, n-dodecyl (meth)acrylate, tetradecyl (meth) acrylate, n-amyl (meth)acrylate, neopentyl (meth)acrylate, cyclopentyl (meth)acrylate, lauryl (meth)acrylate, oleyl (meth)acrylate, palmityl (meth)acrylate, and stearyl (meth) acrylate; other (meth)acrylates such as isobornyl (meth) acrylate, benzyl (meth)acrylate, phenyl (meth)acrylate, 2-bromoethyl (meth)acrylate, 2-phenylethyl (meth)acrylate, and 1-naphthyl (meth)acrylate; alkoxyalkyl (meth)acrylate such as ethoxyethyl (meth)acrylate; mono-, di- and trialkyl esters of ethylenically unsaturated di- and tricarboxylic acids and anhydrides, such as ethyl maleate, dimethyl fumarate, trimethyl aconitate, and ethyl methyl itaconate. As used in the present specification and claims, "(meth)acrylate" denotes both "acrylate" and "methacrylate" and "(meth) acrylic denotes both "methacrylic" and "acrylic."

The ethylenically unsaturated monomer can also include at least one multi-ethylenically unsaturated monomer effective to raise the molecular weight and crosslink the polymer. Examples of multi-ethylenically unsaturated monomers that can be used include allyl (meth)acrylate, tripropylene glycol di(meth)- acrylate, diethylene glycol di(meth)acrylate, ethylene glycol di(meth)acrylate, 1,6-hexanediol di(meth) acrylate, 1,3-butylene glycol (meth)acrylate, polyalkylene glycol di(meth)acrylate, diallyl phthalate, trimethylolpropane tri(meth)acrylate, divinylbenzene, divinyltoluene, trivinylbenzene, and divinylnaphthaiene.

In addition to those monomers which are "functional" in the sense of including one or more polymerizable ethylenically unsaturated groups, monomers which also include one or more additional functional groups can be used in preparing the polymeric latexes used in the process of this invention. An important class of these functional monomers is that made up of the those polymerizable ethylenically unsaturated monomers having acidic functional groups. Examples of these include acrylic acid, methacrylic acid, itaconic acid, beta-acryloxypropionic acid and higher monoacidic oligomers of acrylic acid, ethacrylic acid, alpha-chloroacetic acid, alpha-vinylacrylic acid, crotonic acid, alpha-phenylacrylic acid, cinnamic acid, chlorocinnamic acid, beta-styrylacrylic acid, itaconic acid, maleic acid, dihydrogen phosphate esters of an alcohol in which the alcohol also contains a polymerizable vinyl or olefinic group, such as allyl phosphate, allyl Cellusolve™ phosphate, mono- or diphosphate of bis (hydroxy-ethyl) fumarate or itaconate, derivatives of (meth) acrylic acid esters, such as, for example, phosphates of hydroxyalkyl(meth)acrylates including 2-hydroxyethyl (meth)acrylate.

Small amounts of acid-functional copolymerizable monomer, such as methacrylic acid, acrylic acid, and/or itaconic acid, are typically included in preparing polymeric latexes to confer colloidal stability.

Other types of copolymerizable functional monomers can also be included, depending on the ultimate application for which the product produced by the process of the present invention is intended. For example, small amounts of adhesion-promoting copolymerizable monomers can also be included. Examples of other types of functional monomers include hydroxy-functional monomers such as 2-hydroxyethyl (meth)acrylate, amino-functional monomers such as dimethylaminoethyl (meth)acrylate, epoxy-functional monomers, such as glycidyl methacrylates and the like.

Examples of synthetic polymeric latexes which can be used include acrylic copolymer latexes, such as butyl acrylate/methyl methacrylate/acid and ethyl acrylate/methyl methacrylate/acid copolymer latexes; vinyl acetate homopolymer and copolymer latexes, including ethylene/ vinyl acetate copolymer latexes, styrene/butadiene copolymer latexes, and the like.

By selecting the type and concentration of monomers having known glass transition temperatures and acid functionalities, polymeric latexes having properties useful in the process of the invention as well as being specifically suited as binders for the specific coating or film formulation application can be prepared.

The particle size and molecular weight of the polymeric latex can be selected by the choice of a particular polymerization process, as for example through the use of particular initiator and chain transfer systems, as is well known in the polymerization arts. The average particle size and the molecular weight of the polymeric latex are important with regard to the properties of the polymeric latex when it is employed as a binder in the the fully formulated aqueous composition.

Preferably, the polymeric latex used in the process of the present invention has an average particle diameter in the range of from approximately four times the average particle diameter of the inorganic material pigment particles down to about 20 nm. For example, if the inorganic material particle to be dispersed has an average particle size of about 200 nanometers, the polymeric latex particle should have an average particle size in the range of from about 20 to less than about 800 nanometers. By "average particle size" or "average particle diameter" is meant an average determined experimentally by the quasielastic light scattering technique, such as provided, for example, by the Model BI-90 Particle Sizer, of Brookhaven Instruments Corp.

The selection of the relative surface charges of the polymeric latex particles and the inorganic material particles in the medium used for conducting the process of the present invention is an important variable which effects both the extent of dispersion and the stability of the resulting dispersion. It is preferred that the surface charge of the polymeric latex be of the same sign of charge as the sign of the surface charge of the inorganic material particle. More particularly, in aqueous formulations it is preferred that the polymeric latex and the inorganic material particle both have a negative surface charge. Furthermore, it is preferred that the surface charge on the polymeric latex be more negatively charged than the surface charge on the inorganic material particle. It is especially preferred that the surface charge on the polymeric latex be at least about 30 millivolts more negatively charged than the surface charge on the inorganic material particle.

For example, in the case of the process of the present invention, where the zeta potential of the inorganic material particles in the aqueous medium is about −50 mv, it is believed that minimum grit formation occurs, when the zeta potential of the polymeric latex is more negative than −50 mv, preferably from about −50 mv to about −100 mv. The polymeric latex particles preferably have a surface charge of from about −30 mv to about −100 mv in order to form a stable dispersion with the inorganic material particles, in those cases in which the inorganic material particles have a zeta potential from about zero to −50 mv.

As in other aqueous systems including charged particles, the magnitude of the effective electrical repulsive forces depends on the dielectric strength and the ionic strength of the medium. As a practical matter, the dielectric strength will be determined by the dielectric constant of water, because, while many aqueous coating compositions include small amounts of organic cosolvents for various purposes, such as encouraging coalesence and film formation by polymeric latex particles used as binder, these do not significantly vary the dielectric constant of the medium.

On the other hand, the ionic strength of the medium in coating compositions can vary over a significant range, and include contributions from a variety of simple ions and polyionic species. For example, coatings compositions typically range in pH from about 6 to 11 or more, a range of five orders of magnitude in the concentration of hydroxyl ion.

While the strength of the repulsive forces between the polymeric latex particles and the inorganic material particles can be varied to some extent by adjusting the ionic strength of the aqueous medium through varying the pH and by addition of charged species, in general it is more desirable to vary the surface charge density as reflected by the zeta potential of the polymeric latex particles instead.

Varying the pH is of course likely to change the zeta potential of both the inorganic material particles and the polymeric latex particles directly. However, charged species added to adjust the ionic strength will also be present in the formulated coating composition, and the product formed by the coating composition, and the effect of the presence of the charged species on the formulated coating composition and the ultimate product must be carefully considered. Preferably, in most cases, no ionic species are added merely to adjust the ionic strength of the medium, and any desired adjustment in the magnitude of the electrical repulsive forces is effected in another manner.

The surface potential of the inorganic material particles can be adjusted in a number of different ways. As discussed above, the particles can be pretreated to provide inorganic surface coatings, such as coatings of silica, aluminum oxide, or mixtures of silica and aluminum oxide, on titanium dioxide particles. In addition, small molecular species, such as silanes or titanates, can be adsorbed on and reacted with surface of the inorganic material particles, and the resulting surface sites can be subsequently modified chemically to provide surface charges. Examples of such species include N-2-aminoethyl-3-aminopropyltrimethoxy silane, 3-aminopropyltrimethoxysilane, 3-methacryloxypropyltrimethoxysilane, and vinyltriacetoxysilane. Alternatively, species having the desired charge, or which can be modified subsequently to have the desired charge, can be simply adsorbed to the surface of the inorganic material particles.

The selection of additives for adjusting the surface charge of the inorganic material particles depends on whether the surface charge on the particle needs to be raised or lowered. Additives which can be employed for the purpose of making the surface charge more negative include commonly available anionic surfactants and polysoaps, while a variety of monomeric and polymeric amino compounds or their quaternary derivative compounds can be employed if a less negative surface charge is desired.

Examples of suitable anionic surfactants include anionic polyelectrolyte pigment dispersants, such as polyacrylic acid, polymethacrylic acid, copolymeric acids including copolymeric acids including copolymerized maleic acid, polyphosphates such as potassium tripolyphosphate, ammonium, alkali metal, alkaline earth metal, and lower alkyl quaternary ammonium salts of: sulfosuccinates such as di($C_7$–$C_{25}$)alkylsulfosuccinates and higher alkyl sulfosuccinates, such as octyl sulfosuccinate; sulfates such as the higher fatty alcohol sulfates, for example, lauryl sulfate; sulfonates including aryl sulfonates, alkyl sulfonates, and the alkylaryl sulfonates, for example, isopropylbenzene sulfonate, isopropylnaphthalene sulfonate and N-methyl-N-palmitoyltaurate, isothionates such as oleyl isothionate; and the like. Additional examples include the alkylarylpoly(ethyleneoxy) ethylene sulfates, sulfonates and phosphates, such as t-octylphenoxypoly(ethyleneoxy) ethylene sulfates and nonylphenoxypoly(ethyleneoxy) ethylene phosphates, either having one to seven oxyethylene units.

Examples of suitable monomeric and polymeric amino compounds for reaction with excess negative surface charges on the inorganic material particle surface include alkylbenzylammonium halides such as diisobutylphenoxyethoxyethyldimethylbenzyl ammonium chloride, tertiary amines formed by ethoxylation of primary amines such as primary tallow amines, imidazoline and piperazine derivatives, 2-methyl-2-aminomethylpropanol, and the like.

Two important properties of the polymeric latex for the purpose of the process of the invention are the glass transition temperature of the polymeric latex and the amount of acid functionality in the polymeric latex. While the chemical composition of a polymeric latex binder is important for achieving the resultant properties of the coating or film when the polymeric latex also acts as the binder, the glass transition temperature and amount of acid functionality in the polymeric latex are important in the process of forming the aqueous dispersion. The amount of acid functionality at the surface of the polymeric latex particles is believed to be especially important, as it is believed to relate directly to the surface charge density and zeta potential of the polymeric latex particles. In a presently preferred embodiment of the present process, a polymeric latex is employed by a process which preferentially provides acid functionality at the surface of the polymer latex particles. Examples of polymerization processes which preferentially provide surface acid are described in K. L. Hoy, *J. Coat. Tech.*, 51, 27–41 (1979).

The improved performance of coatings formulations prepared by the present process is achieved even in the presence of substantial amounts of large particle size extenders, such as large size calcium carbonate and alumino silicate, sometimes employed in such formulations. The improvement is not lost upon the incorporation of large size inorganic or organic particles, such as extender pigment particles.

In addition, the improved properties achievable by use of the process of this invention are realized when the formulation is prepared with conventional thickeners of the associative and non-associative types; this improvement is not dependent upon the selected thickener.

The process of the invention may be carried out in a number of alternative manners.

In one embodiment the surface charge of the inorganic material particles is adjusted and then the surface charge-adjusted inorganic material particle is simply milled directly with the polymeric latex. In another embodiment, the inorganic material particles, which have not had their surface charge already adjusted, are pre-dispersed in the absence of the polymeric latex. This is followed by either blending with the polymeric latex then adjusting the medium with surface charge adjusting additives or blending with the polymeric latex containing surface charge adjusting additives.

The process can involve the direct grinding of dry inorganic material particles in water with polymeric latex. In contrast with conventional pigment dispersion processes, the pigment dispersion process employed in the present invention is useful to prepare a concentrated pigment dispersion wherein the final concentration of pigment in the coating composition can be obtained directly in this one step without the formation of grit.

In carrying out the process of the present invention, it may be desirable to adjust the pH of the aqueous solution used for carrying out the process to a pH in the range of from about a pH of 6 to a pH of about 10.

Many different sizes of inorganic material particles can be employed in the process of the present invention, ranging from relatively small particle size, such as on the order of 100 nm, up through large particle size extender pigments, on the order of ten thousand nanometers, typically included in many types of formulations to reduce raw material costs. Examples of inorganic materials which can have large particle size and be used in the present process include calcium carbonate, alumino-silicate, amorphous silica, and the like. Mixtures of particles differing in chemical identity, particle size, or both, can be used.

Similarly, the aqueous medium in which the inorganic material particles are ground with the polymeric latex dispersant can also include water-miscible solvents, such as glycols and glycol ethers, such as conventional in the coatings arts. Examples of water-miscible solvents employed include propylene glycol, ethylene glycol, ethylene glycol monomethyl ether, and the like.

Aqueous coating compositions are frequently formulated at alkaline pH to stabilize anionically charged latex binder against agglomeration and for other reasons. The principles of formulating aqueous coating compositions are reviewed, for example, in *Formulation of Organic Coatings* (N. I. Gaynes ed. D. Van Nostrand Co. Inc. Princeton, N.J. 1967) at pp. 189–230.

The present invention provides aqueous dispersions which can be used in a variety of applications. In some cases, in which a "soft" (i.e. low glass transition temperature) polymeric latex has been used, the resulting aqueous dispersion can be used as is, or with the addition of other components, the soft polymeric latex serving as binder for the composition. In other cases, additional polymeric latex will be added in formulating aqueous compositions for various applications, and the additional polymer latex will serve as the product binder in addition to or instead of the polymeric latex forming the aqueous dispersion.

Often the binder-forming latex polymer particles contain carboxyl functional groups. Under suitable conditions, the carboxyl groups are ionized and the resultant charges on the latex particle surface electrostatically stabilize the latex against premature agglomeration. Often a volatile base, typically ammonia, is used to adjust the pH of the coating composition. When the coating composition is applied to a substrate to be coated, the volatile base is lost and the pH of the coating composition drops, destabilizing the latex particles of the binder and thus encouraging agglomeration to form a continuous binder film.

In addition to polymeric latex particles and inorganic material particles, aqueous coating compositions prepared according to the process of the present invention can include typical coatings ingredients. For example, they can include extender pigments as noted above such as calcium carbonate, amorphous silica, and the like; defoamers; biocidal agents such as zinc oxide, 2-N-octyl-4-isothiazole-3-one, and phenyl mercuric acetate; coalescing agents such as diethylene glycol monoethyl ether acetate and ethylene glycol monobutyl ether acetate; plasticizers such as dialkyl phthalates including dibutyl phthalate, dioctyl phthalate and the like; freeze-thaw stabilizers such as ethylene glycol, propylene glycol and diethylene glycol; nonionic wetting agents such as polyethylenoxylates of fatty acids, alkanols, alkylphenols, and glycols; polyelectrolyte pigment dispersants at low levels; thickeners such as polyelectrolyte and cellulosic thickeners; rheology control agents such as associative thickeners and the like; colorants such as colored pigments and dyes; perfumes; cosolvents and the like.

The performance property improvements which can be realized by the process of the present invention are not limited to coatings formulations. The present process is useful in other formulations utilizing other types of inorganic particles. For example in the case of conventional emulsion polymer-based pressure sensitive adhesive formulations it would be desirable from a cost perspective to utilize extenders without compromising on performance, however, the use of extenders in such formulations typically can not be accomplished with a significant reduction in properties such as, for example, peel resistance and tack. Because of the ability of the process of the invention to effectively disperse extender particles in a pressure sensitive film, we have found it possible to utilize certain inorganic particle extenders, such as, for example, silica, in pressure sensitive adhesive formulations with an increase in peel, shear and tack properties particularly at high filler loadings as compared with the same formulation using conventional dispersants for the extender pigment. The ability to obtain improved performance properties while at the same time reducing the cost of a pressure sensitive adhesive formulation is another important result of the process of the present invention. This result is not limited to the use of silica as an extender for pressure sensitive adhesive formulations. We have also found that calcium carbonate can be used as a filler in roof mastic formulations by employing the process of the invention. In this regard we have found that roof mastics prepared by the process containing calcium carbonate filler exhibited lower modulus together with improved stress, elongation, and toughness especially at high filler loading. Conversely, by utilizing the process of the invention higher concentrations of inorganic particle filler can be used without attrition in the mechanical properties of the roof mastic.

Similarly, the process of the present invention has been found useful for preparing inorganic particle-filled binders for textiles and nonwovens, including binders for fiberfill. In some cases, it may be desirable to entrain air in the binder by frothing before application to the substrate material.

The process of the invention is also useful in preparing coatings for paper. Clay is used as a filler in paper coatings but clay particles tend to align themselves together in such a way as to create undesirably high gloss in the coated paper. We have found that the process of the invention can be utilized to disperse clay particles and lower the gloss of coated paper and cardboard substrates. Furthermore, we have also found that the coated substrates are Smoother and stronger than conventional paper coatings prepared by conventional techniques.

As in the case of adhesives, fillers are typically not employed at significant amounts in fiberfill binders. We have found that the process of the invention can be used to disperse clay and calcium carbonate in such applications. Furthermore the process of the present invention permits the elimination of conventional polyelectrolyte dispersants and has been demonstrated as improving the washability, both wet and dry, as well as the wet and dry tensile strength of the fiberfill as compared to conventionally dispersed filler-containing fiberfill materials.

Other coating systems such as for example roof mastic coating formulations employing inorganic particles as pigments, fillers and extenders can be improved by the use of the process of this invention.

In the examples, the following abbreviations are used:
MAA methacrylic acid
BA butyl acrylate
PSA pressure sensitive adhesive
DI deionized The illustrative examples which follow will aid those skilled in the art in understanding the present invention; however, the present invention is in no way limited thereby. In the examples which follow, percentage composition is by weight, unless otherwise noted.

EXAMPLES 1–3

Pressure sensitive adhesives ("PSA") based on polymeric latex typically do not contain inorganic extender pigments. Although including low cost extender pigments would result in reducing the raw material costs of manufacturing pressure sensitive adhesives, the use of conventional methods to disperse extender pigments in polymeric latex PSA results in a substantial decrease in PSA properties, especially peel resistance and tack.

In order to disperse silica according to this invention with a PSA polymeric latex (98 BA/2 MAA, 0.5 micron particle size, 53 percent by weight solids) which has a negative charge on the surface of the polymeric latex particles, albeit at a lower level than the Imsil A-10 natural ground silica (zeta potential of about −80 mv at pH of 9), the silica was treated with Dow Corning Z-6020 aminosilane (aminoethylaminopropyltrimethoxysilane) to lower the negative charge density of silica surface. The amount of Z-6020 silane can be empirically determined by running concentration ladders to give good dispersion of polymeric latex with the inorganic material particles without gross aggregation of the polymeric latex with silica to provide Examples 1–3. Comparative examples 1–2 have the same composition, except Tamol® (trademark of Rohm and Haas Co.) 731 polyelectrolyte was used as the dispersant for the silica. Examples 1–3 differ in the ratio of silica to polymeric latex.

The dispersion of silica and polymeric latex was prepared according to this invention as follows: The following ingredients were ground at 3000 rpm for 15 minutes using a Cowles dissolver to provide a treated silica suspension with a less negative surface potential:

| Component | Parts by Weight |
| --- | --- |
| Imsil A-10 silica | 324 |
| deionized water | 215.8 |
| NH$_4$OH (28%) | (to pH = 9) |
| mixture of (3 parts Dow Corning Z-6020, 1.25 part acetic acid, and 18 part water) | 2.4 |

Differing ratios of the treated silica suspension were added with mechanical stirring to the polymeric latex (pH preadjusted to 9) along with additional water to adjust the solids level and defoamer as follows to provide pressure sensitive adhesives dispersed with polymeric latex (Examples 1–3):

| Example | 1 | 2 | 3 |
| --- | --- | --- | --- |
| silica suspension | 45 | 90 | 135 |
| deionized water | 16.4 | 8.2 | 0 |
| polymeric latex | 186.8 | 166.0 | 145.3 |
| Bubble Breaker 3056A antifoamer | 0.19 | 0.17 | 0.15 |

A series of comparative examples in which the silica was dispersed by a conventional polyelectrolyte dispersant were prepared as follows. The following ingredients were ground at 3000 rpm for 15 minutes using a Cowles dissolver to provide conventional dispersions of silica:

| | Parts by weight |
| --- | --- |
| Imsil A-10 silica | 324 |
| deionized water | 115 |
| NH$_4$OH (28%) | (to pH = 9) |
| Tamol 731 (25%) dispersant | 12.96 |

Pressure sensitive dispersions were then prepared by adding the conventionally dispersed silica to the polymeric latex in differing ratios with mechanical stirring as follows:

| Comparative Example | 1 | 2 |
| --- | --- | --- |
| silica dispersion | 45 | 135 |
| deionized water | 37.4 | 34.2 |
| polymeric latex | 223.1 | 173.7 |
| Bubble Breaker 3056A antifoamer | 0.19 | 0.15 |

Samples of the silica-filled pressure sensitive adhesives were coated to the treated side of 1.2 mil polypropylene film, and dried 5 minutes at 70° C. to give a final adhesive thickness of 1 mil. The performance of those adhesives on a stainless steel surface is reported in Table I. These results show that the silica adhesives according to the present invention show better peel, shear and tack, especially at higher filler loading.

TABLE I

| Adhesives | PVC[1] | Peel[2] (oz/in) | Shear[3] (hours) | Polyken[4] Tack | Finger[5] Tack |
| --- | --- | --- | --- | --- | --- |
| Example 1 | 10 | 24 | 2.3 | 540 | V.Good |
| Comparative Example 1 | 10 | 18 | 2.8 | 520 | V.Good |
| Example 2 | 20 | 20 | 4.3 | 480 | Good |
| Example 3 | 30 | 11 | 8.8 | 250 | Fair |
| Comparative Example 2 | 30 | 3 | 4.2 | 90 | Poor |

[1]Calculated silica volume content in dry adhesive
[2]Peel adhesion was measured with an Instron Universal Testing Instrument, Model 1122 equipped with a Microcon 1, and employing a dwell time of one minute and a crosshead speed of 12 inches per minute.
[3]Shear adhesion was measured as by the time required for a test strip adhered to a steel plate with a one-half inch by one inch rectangle of adhesive and suspending a one kilogram weight to fall from the steel substrate.
[4]Polyken tack was measured using a Polyken Probe Tack Tester Series 400 tester (Testing Machines Inc.) using a dwell time of one sec, a speed of one centimeter per second, and an applied pressure of 100 grams per square centimeter.
[5]Finger tack was rated qualitatively.

EXAMPLES 4–6

In the following examples, a small amount (0.05% percent by weight on calcium carbonate solids) of anionic polyelectrolyte dispersant, Tamol 850 dispersant, was used to provide a negative charge on the surface of the calcium carbonate particles. At this level of anionic dispersant, the calcium carbonate particles could be dispersed with a polymeric latex (0.35 micron particle size, zeta potential=−80 mv) to give stable latex/calcium carbonate particle dispersions (Examples 4–6).

Latex/calcium carbonate dispersions were prepared as follows: The following ingredients were ground at 3000 rpm for 15 minutes using a Cowles dissolver (all ingredients are parts by weight):

| Example | 4 | 5 | 6 |
|---|---|---|---|
| Atomite calcium carbonate | 50.1 | 94.5 | 121.5 |
| deionized water | 18.5 | 41.5 | 50.5 |
| NH₄OH (28%) | (to pH = 9) | (to pH = 9) | (to pH = 9) |
| Tamol 850 (30%) dispresant | 0.084 | 0.158 | 0.203 |
| Nopco NXZ antifoam | 0.3 | 0.3 | 0.3 |

The resulting dispersions were added to the following ingredients under stirring:

| | | | |
|---|---|---|---|
| Polymeric latex (55% solids) | 144.6 | 130 | 110 |
| NH₄OH (28%) | (to pH = 9) | (to pH = 9) | (to pH = 9) |
| Nopco NXZ antifoam | 0.3 | 0.3 | 0.3 |
| Natrosol 250 MXR thickener (10% in propylene glycol) | 6.0 | 7.5 | 8.0 |

The ratio of calcium carbonate to polymeric latex solids were selected to provide the following calcium carbonate volume contents in dry films:

| Example: | 4 | 5 | 6 |
|---|---|---|---|
| CaCO₃ volume content in dry films | 20 | 35 | 45 |

In addition, a series of conventionally dispersed compositions (Comparative Examples 3–5) were prepared by increasing the level of anionic polyelectrolyte dispersant by a factor of eight.

Films of samples of Examples 4–6 and Comparative Examples 3–5 were cast and allowed to dry for 3 weeks at 77° F. 50% relative humidity. The final dry film thickness is approximately 20 mil. The mechanical properties of those calcium carbonate-filled polymeric latex films are given in Table II.

The results in Table II show that calcium carbonate films prepared according to the present invention show much lower modulus together with improved stress, elongation and toughness, especially at higher filler loading, than films formed from conventionally dispersed calcium carbonate-filled polymeric compositions. It is expected that the process of the present invention will permit the use of higher contents of inexpensive filler, such as calcium carbonate, to be incorporated in polymeric latex compositions, with less attrition of film mechanical properties such as modulus and toughness.

TABLE II

| Example | PVC[2] | Maximum Stress (psi)[3] | % Elong.[3] | Modulus[3] (psi) | Toughness[3] (psi) |
|---|---|---|---|---|---|
| 4 | 20 | 140 | 710 | 31 | 650 |
| Comp. 3[1] | 20 | 145 | 755 | 34 | 710 |
| 5 | 35 | 185 | 465 | 180 | 620 |
| Comp. 4[1] | 35 | 150 | 330 | 380 | 380 |
| 6 | 45 | 205 | 250 | 360 | 360 |
| Comp. 5[1] | 45 | 165 | 165 | 1600 | 235 |

[1]Comparative example.
[2]Volume concentration of calcium carbonate.
[3]Maximum stress, percent elongation, modulus, and toughness were measured using a Model 1122 Instron Universal Testing Machine using a gauge length of 1.0 inch and a crosshead speed of 2 inches per minute.

EXAMPLE 7

Clay is used as a filler in paper coating. Because the structure of clay is that of a platelet, the clay particles tend to align themselves to create undesireably high gloss in a paper coatings. Clay has a surface charge on its basal planar surfaces which is similar to silica. In order to prepare latex-clay dispersions according to the present invention, Hydrafine® (trademark of I.M. Huber Co.) clay particles (0.7 micron particle size) were treated with a small amount of amino-functional silane (Dow Corning Z-6020) as follows:

The following ingredients were ground at 3000 rpm for 15 minutes using a Cowles dissolver:

| | Parts by Weight |
|---|---|
| Hydrafine clay | 100 |
| deionized water | 44.3 |
| NH₄OH (28%) | (to pH = 9) |
| mixture of (3 part Dow Corning Z-6020, 1.25 part acetic acid and 18 part water) | 0.82 |

The resulting suspension was added to 46.05 parts by weight of Rhoplex® (trademark of Rohm and Haas Co.) B-15 polymeric latex, a commercially available binder for paper coatings ((0.15 micron particle size, preadjusted to pH 9, 39.1% solids) under stirring for 5 minutes, then the pH was dropped to 7 with acetic anhydride to provide a paper coating composition (Example 7). This formulation provides 18 parts of polymeric latex solids on 100 parts of clay.

This process was repeated except that 0.1 parts by weight of Calgon® (trademark of Calgon Corp.) RS-1 pigment dispersant (polyphosphate) was used instead of 0.82 parts by weight of Dow Corning Z-6020 mixture (Comparative Example 6).

Samples of the paper coatings of Example 7 and Comparative Example 6 were coated on paper and on cardboard to equal weight applied with a wire wound rod. The coatings were permitted to dry for one minute at 180° F., and their performance properties were evaluated. The results of the evaluation is reported in Table III. These results show that the latex-clay dispersion according to the present invention provides lower gloss on both paper and cardboard substrates, and also provides a smoother, higher strength (lower wet pick) coating on paper.

TABLE III

| | Gloss[2] | Gloss after Calendered[3] | Smooth[4] | Wet Pick[5] |
|---|---|---|---|---|
| Coating on Paper | | | | |
| Example 7 | 19.3 | 50.1 | 1.7 | 3.3 |
| Comp. 6[1] | 24.8 | 53.6 | 2.2 | 3.7 |
| Coating on Cardboard | | | | |
| Example 7 | 21.0 | 58.9 | 3.5 | 4.0 |
| Comp. 6[1] | 30.5 | 63.4 | 2.8 | 3.0 |

[1]Comparative example.
[2]Gloss was measured at 75°.
[3]Calendering was performed on paper using one pass at 500 feet per minute at 200° F. and 600 psi. Calendering was performed on cardboard using one pass at 500 feet per minute at 250° F. at 300 psi.
[4]Smoothness was measured by air flow over the surface, and ranked on a scale of 1 to 4, with the 1 being best.
[5]Wet pick was measured by applying a 20% aqueous isopropanol solution to the coated stock using a roller to wet the stock and subsequently evaluating the pick resistance qualitatively on a scale of 1 to 4.

EXAMPLES 8–9

Rhoplex TR-407 (Tg=30° C., 0.25 micron particle size, 45.5 percent solids) polymeric latex is used commercially to bind fibers. In such applications, filler pigment is not typically used, because conventional methods employed to disperse inorganic filler materials in polymeric latex binders result in poor fiberfill performance.

Two different filler materials, Albaglos® (trademark of Pfizer Corp.) calcium carbonate (0.75 micron particle size) and Hydrafine clay, were dispersed with polymeric latex using the process of the present invention. In the case of Albaglos calcium carbonate it was not necessary to add even a small amount of anionic polyelectrolyte to obtain a stable latex-Albaglos calcium carbonate dispersion. Polymeric latex-inorganic particle dispersions were prepared as follows:

The following ingredients were ground at 3000 rpm for 15 minutes using a Cowles dissolver (all ingredients are parts by weight):

| Example | 8 | 9 |
|---|---|---|
| Albaglos calcium carbonate | 600 | 0 |
| Hydrafine clay | 0 | 600 |
| deionized water | 415.6 | 415.6 |
| NH$_4$OH (28%) | (to pH = 9) | (to pH = 9) |
| Mixture of (3 part Dow Corning Z-6020, 1.25 part acetic acid, and 18 part water) | 0 | 4.11 |

To each of the resulting dispersions were added 1318.7 parts by weight of Rhoplex TR-407 polymeric latex (preadjusted pH to 9) under stirring for 5 minutes, providing fiberfill coating materials (Examples 8 and 9) having 100 parts of polymeric latex solids on 100 parts of filler.

The dispersion processes were repeated except that 8.01 parts by weight of Tamol 850 (30% solids) polyelectrolyte dispersant was used for both fillers instead of none for Albaglos and 4.11 parts by weight of the Dow Corning Z-6020 silane mixture for Hydrafine clay to give Comparative Examples 7 and 8.

Samples of the fiberfill binders were sprayed on polyester fiber at fiber/polymeric latex solids =100/15 by weight, and were dried and cured at 150° C. for 5 minutes. The performance of the fiberfill binders was evaluated and is reported in Table IV. These results show that fiberfill binders according to the present invention show better washability, wet and dry tensile strength than the respective conventionally dispersed binders.

TABLE IV

| | | Tensile Strength (psi) | |
|---|---|---|---|
| Example | Washability[2] | Dry[3] | Wet[4] |
| 8 | 1.5 | 695 | 115 |
| Comp. 7[1] | 1.0 | 570 | 40 |
| 9 | 4.5 | 935 | 440 |
| Comp. 8[1] | 3.7 | 705 | 130 |

[1]Comparative example.
[2]Washability was measured using Dacron ® 371W fibers (not heat-bonded) as polyester fiber, and washing in a washing machine (full cycle, 50°-60° C. hot water, one-half cup Permico Plus industrial detergent) and ranked 1–5 qualitatively (5 best).
[3]Dry and wet tensile strength was measured according to ASTM D-1117 (4 inch gauge, 300%/minute). For wet tensile the sample is soaked for 30 minutes in water containing 0.1 percent by weight Triton X-100 surfactant.

EXAMPLES 10–12

Example 9 and Comparative Example 8 were repeated, except that one percent on solids of anionic surfactant was subsequently added to each, and the dispersions were then frothed to a density of 0.08 gm/cc and coated on one side of the air laid non-woven batt using a padder (one nip, no external pressure on the roll) to give Example 10 and Comparative Example 9. Add-on was at 2.6 oz/sq. yd. A subjective hand analysis was made on the finished samples to determine their relative firmness and showed that Example 10 was firmer than Comparative Example 9.

The process of Example 10 was again repeated except that instead of treatment with the aminosilane the clay was treated either by addition of aluminum sulfate or the pH was lowered by addition of glacial acetic acid as follows to give Examples 11 and 12 respectively.

The following ingredients were added in order with good agitation:

| | Example 11 | Example 12 |
|---|---|---|
| Hydrafine clay | 50 | 50 |
| DI water | 25 | 27.26 |
| Al$_2$(SO$_4$)$_3$ · 16–18 H$_2$O | 0.61 | — |
| DI water | 9.39 ] -premix | — |
| Rhoplex TR-407 (45.5% solids) | 109.89 | 109.89 |
| glacial acetic acid | — | 7.74 |

A subjective hand analysis was made on the finished samples to determine their relative hardness. It was found that the sample of Examples 11 and 12 were harder than the sample of Comparative Example 9.

These results show the superior results obtainable with clay particles using the process of the present invention.

Various modifications can be made in the details of the various embodiments of the compositions and processes of the present invention, all within the spirit and scope of the invention as defined by the appended claims.

We claim:

1. A process for preparing a stable aqueous dispersion, the process comprising:
   a) providing a suspension of polymeric particles in a first aqueous medium, the polymeric particles having a negative surface charge in the aqueous medium;
   b) suspending inorganic material particles in a second aqueous medium wherein the inorganic material particles are clay,
   c) adjusting the zeta potential of the inorganic material particles by addition of an aminosilane compound such that the difference between the zeta potential of the inorganic material particles and the polymeric particles is at least about 30 mv to provide the stable dispersion, the inorganic material particles having a negative surface charge, the surface charge of the polymeric particles being more negative than the surface charge of the inorganic material particles; and
   d) mixing the first aqueous medium and the second aqueous medium.

2. A process for preparing a stable aqueous dispersion, the process comprising
   a) providing a suspension of polymeric particles in a first aqueous medium, the polymeric particles having a negative surface charge in the aqueous medium;
   b) suspending inorganic material particles in a second aqueous medium;
   c) adjusting the zeta potential of the inorganic material particles such that the difference between the zeta potential of the inorganic material particles and the polymeric particles is at least about 30 mv to provide the stable dispersion, the inorganic material particles having a negative surface charge, the surface charge of the polymeric particles being more negative than the surface charge of the inorganic material particles;

d) mixing the first aqueous medium and the second aqueous medium; and e) applying the aqueous dispersion to a fiberfill material to coat the fiberfill material to provide a bound fiberfill material.

3. A process for preparing a stable aqueous dispersion, the process comprising a) providing a suspension of polymeric particles in a first aqueous medium, the polymeric particles having a negative surface charge in the aqueous medium;

b) suspending inorganic material particles in a second aqueous medium;

c) adjusting the zeta potential of the inorganic material particles such that the difference between the zeta potential of the inorganic material particles and the polymeric particles is at least about 30 mv to provide the stable dispersion, the inorganic material particles having a negative surface charge, the surface charge of the polymeric particles being more negative than the surface charge of the inorganic material particles;

d) mixing the first aqueous medium and the second aqueous medium; and e) coating a non-woven or textile material with the dispersion.

4. A process according to claim 3 additionally comprising frothing the stable dispersion before coating the material.

5. A process according to claim 2 wherein the inorganic material particles are clay, and the zeta potential of the inorganic material particles is adjusted by addition of aminosilane compound.

6. A process according to claim 3 wherein the inorganic material particles are clay, and the zeta potential of the inorganic material particles is adjusted by addition of aminosilane compound.

* * * * *